(12) United States Patent
Yamada

(10) Patent No.: US 7,258,400 B2
(45) Date of Patent: Aug. 21, 2007

(54) VEHICLE-SEAT RETRACTING APPARATUS

(75) Inventor: Yukifumi Yamada, Toyota (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 116 days.

(21) Appl. No.: 11/166,205

(22) Filed: Jun. 27, 2005

(65) Prior Publication Data

US 2006/0006720 A1      Jan. 12, 2006

(30) Foreign Application Priority Data

Jun. 28, 2004   (JP)   ............... 2004-190072

(51) Int. Cl.
*B60N 2/36*   (2006.01)
*B60N 2/48*   (2006.01)

(52) U.S. Cl. ............... 297/378.12; 297/378.14; 297/408

(58) Field of Classification Search ............... 297/408, 297/378.12, 378.14
See application file for complete search history.

(56) References Cited

U.S. PATENT DOCUMENTS

| 5,681,079 A | * | 10/1997 | Robinson | 297/408 X |
| 5,738,411 A | * | 4/1998 | Sutton et al. | 297/378.12 |
| 5,826,942 A | * | 10/1998 | Sutton et al. | 297/378.12 |
| 5,913,570 A | * | 6/1999 | Yoshida et al. | 297/378.14 |
| 6,074,011 A | * | 6/2000 | Ptak et al. | 297/408 |
| 6,817,646 B2 | * | 11/2004 | Kikuchi et al. | 297/378.12 X |
| 6,860,564 B2 | * | 3/2005 | Reed et al. | 297/408 |
| 6,880,890 B1 | * | 4/2005 | DeBrabant | 297/408 |
| 7,044,555 B2 | * | 5/2006 | Saberan | 297/408 |
| 7,152,923 B2 | * | 12/2006 | Charras et al. | 297/378.12 |
| 2005/0067874 A1 | * | 3/2005 | Kamrath et al. | 297/408 |
| 2005/0179301 A1 | * | 8/2005 | Clark et al. | 297/408 |

FOREIGN PATENT DOCUMENTS

JP   2004-008493   1/2004

* cited by examiner

*Primary Examiner*—Rodney B. White
(74) *Attorney, Agent, or Firm*—Finnegan, Henderson, Farabow, Garrett, & Dunner L.L.P.

(57) ABSTRACT

In a vehicle-seat retracting apparatus, a seating state is switched to a non-seating state by retracting a headrest and tilting a seat back relative to a seat cushion (lower arm). In association with retraction of the headrest, the tilting angle of the seat back with respect to the seat cushion is unlocked.

8 Claims, 7 Drawing Sheets

VEHICLE-SEAT RETRACTING APPARATUS

CROSS REFERENCE TO RELATED APPLICATIONS

This application is based on and claims priority under 35 U.S.C. § 119 to Japanese Patent Application 2004-190072, filed on Jun. 28, 2004, the entire content of which is incorporated herein by reference.

BACKGROUND OF THE INVENTION

1. Field of the Invention

The present invention relates to a vehicle-seat retracting apparatus in which a headrest is retracted and a seat back tilts relative to a seat cushion in order to perform switching from a seating state to a non-seating state.

2. Description of the Related Art

Various vehicle-seat retracting apparatuses have been proposed heretofore. For example, Japanese Unexamined Patent Application Publication No. 2004-8493 discloses a vehicle-seat retracting apparatus in which a seat back 92 of a rear seat 90 is tilted forward to be placed on a seat cushion 91, as shown in FIG. 7 In the rear seat 90, a headrest 94 is retracted in order to prevent the seat back 92 from interfering with a front seat 93 during tilting.

In a state in which the headrest 94 remains standing in a manner similar to that when a passenger sits on the rear seat 90, the leading end of the headrest 94 follows the path shown by a curve C1 while the seat with the seat back 92 tilts, and interferes with the front seat 93 in a diagonally shaded region D. Consequently, the seat back 92 cannot be folded. Therefore, in order to prevent the interference with the front seat 93, the seat back 92 is folded so that the leading end thereof follows the path shown by a curve C2 after the headrest 94 is retracted.

The curve C1 coincides with the path of the leading end of the headrest 94 made when the tilting angle of the seat back 92 is adjusted for the seated passenger. However, the rear seat 90 is, of course, not used in a state in which the seat back 92 is tilted forward to a degree such as to interfere with the front seat 93.

In the vehicle-seat retracting apparatus disclosed in the above publication, an operation of retracting the headrest and an operation of unlocking the tilting angle of the seat back with respect to the seat cushion are independent from each other, and need to be performed in predetermined procedures. If the operations are performed in a wrong manner, they must be performed again, and this is troublesome.

SUMMARY OF THE INVENTION

Accordingly, it is an object of the present invention to provide a vehicle-seat retracting apparatus that allows an operation of retracting a headrest and an operation of unlocking the tilting angle of a seat back with respect to a seat cushion to be performed easily.

In order to overcome the above problem, in a vehicle-seat retracting apparatus according to an embodiment of the present invention, a seating state is switched to a non-seating state by retracting a headrest and tilting a seat back relative to a seat cushion, and a tilting angle of the seat back with respect to the seat cushion is unlocked in association with retraction of the headrest.

In this case, on the assumption that the headrest is retracted to avoid interference with, for example, a peripheral member such as an adjacent seat, the tilting angle of the seat back with respect to the seat cushion is unlocked in association with the retraction so that the seat back can tilt. Therefore, switching can be performed from a seating state to a non-seating state without any influence of other operation members (e.g., an operation lever for unlocking the tilting angle) as long as the headrest is retracted.

Preferably, an adjustable range of the tilting angle is extended from a range set for the seating state to a range set for the non-seating state in association with retraction of the headrest.

In this case, in other words, the tilting angle cannot be adjusted beyond the adjustable range set for the seating state unless the headrest is retracted. This prevents the passenger from sitting on the seat tilted at an inappropriate angle.

Preferably, the tilting angle is allowed to be locked within an adjustable range set for the seating state when the retracted headrest is returned.

In this case, unless the retracted headrest is returned, the tilting angle cannot be locked even within the adjustable range set for the seating state. This prevents the passenger from sitting on the seat while the headrest remains retracted.

Preferably, the tilting angle is allowed to be locked within an adjustable range set for the seating state when the headrest is completely retracted or is returned.

In this case, the tilting angle can be locked, regardless of whether or not the headrest is retracted. For example, only the headrest can be retracted in the seating state in order to widen the field of view. Since only the headrest needs to be returned when the passenger sits on the seat, switching to the seating state can be performed easily.

A vehicle-seat retracting apparatus according to another embodiment of the present invention switches a seating state to a non-seating state by retracting a headrest and tilting a seat back relative to a seat cushion. The vehicle-seat retracting apparatus includes a lock member for locking a tilting angle of the seat back with respect to the seat cushion, an interlock member supported by the seat back to operate in association with retraction of the headrest, and an unlock member connected to the interlock member to unlock the tilting angle in conjunction with the interlock member.

On the assumption that the headrest is retracted to avoid interference with, for example, a peripheral member such as an adjacent seat, the tilting angle of the seat back with respect to the seat cushion is unlocked in association with the retraction so that the seat back can tilt. Therefore, switching can be performed from a seating state to a non-seating state without any influence of other operation members (e.g., an operation lever for unlocking the tilting angle) as long as the headrest is retracted.

Preferably, the vehicle-seat retracting apparatus further includes a tilting-angle switching member supported by the seat back to connect the interlock member and the unlock member, and a retaining member provided in the seat cushion. The tilting-angle switching member is retained by the retaining member to regulate an adjustable range of the tilting angle to a seating adjustable range set for the seating state, and separates from the retaining member in conjunction with the interlock member to extend the adjustable range from the seating adjustable range to a non-seating adjustable range set for the non-seating state.

In this case, in other words, the tilting angle cannot be adjusted beyond the adjustable range set for the seating state unless the headrest is retracted. This prevents the passenger from sitting on the seat tilted at an inappropriate angle.

Preferably, the unlock member allows the tilting angle to be locked by the lock member within the adjustable range set for the seating state in conjunction with the interlock member when the retracted headrest is returned.

In this case, unless the retracted headrest returns, the tilting angle cannot be locked even within the adjustable range set for the seating state. This prevents the passenger from sitting on the seat while the headrest remains retracted.

Preferably, the unlock member allows the tilting angle to be locked by the lock member within the adjustable range set for the seating state in conjunction with the interlock member when the headrest is completely retracted or is returned.

In this case, the tilting angle can be locked by the lock member, regardless of whether or not the headrest is retracted. For example, only the headrest can be retracted in the seating state in order to widen the field of view. Since only the headrest needs to be returned when the passenger sits on the seat, switching to the seating state can be performed easily.

DESCRIPTION OF THE PREFERRED EMBODIMENTS

First Embodiment

A first embodiment of the present invention will be described below with reference to the drawings.

Figure 1:
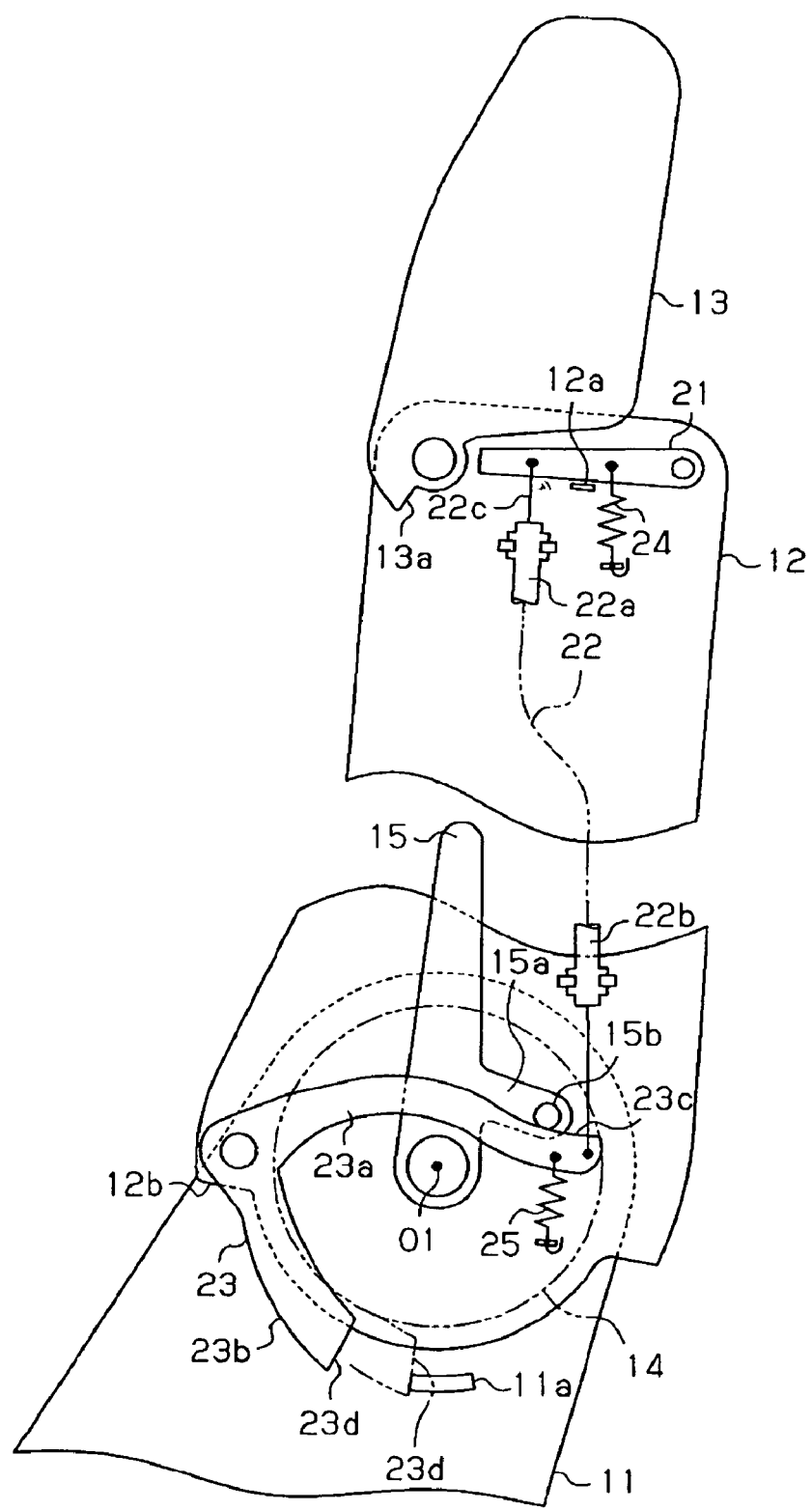
FIG. 1 is a side view schematically showing a first embodiment of the present invention.
Figure 2:
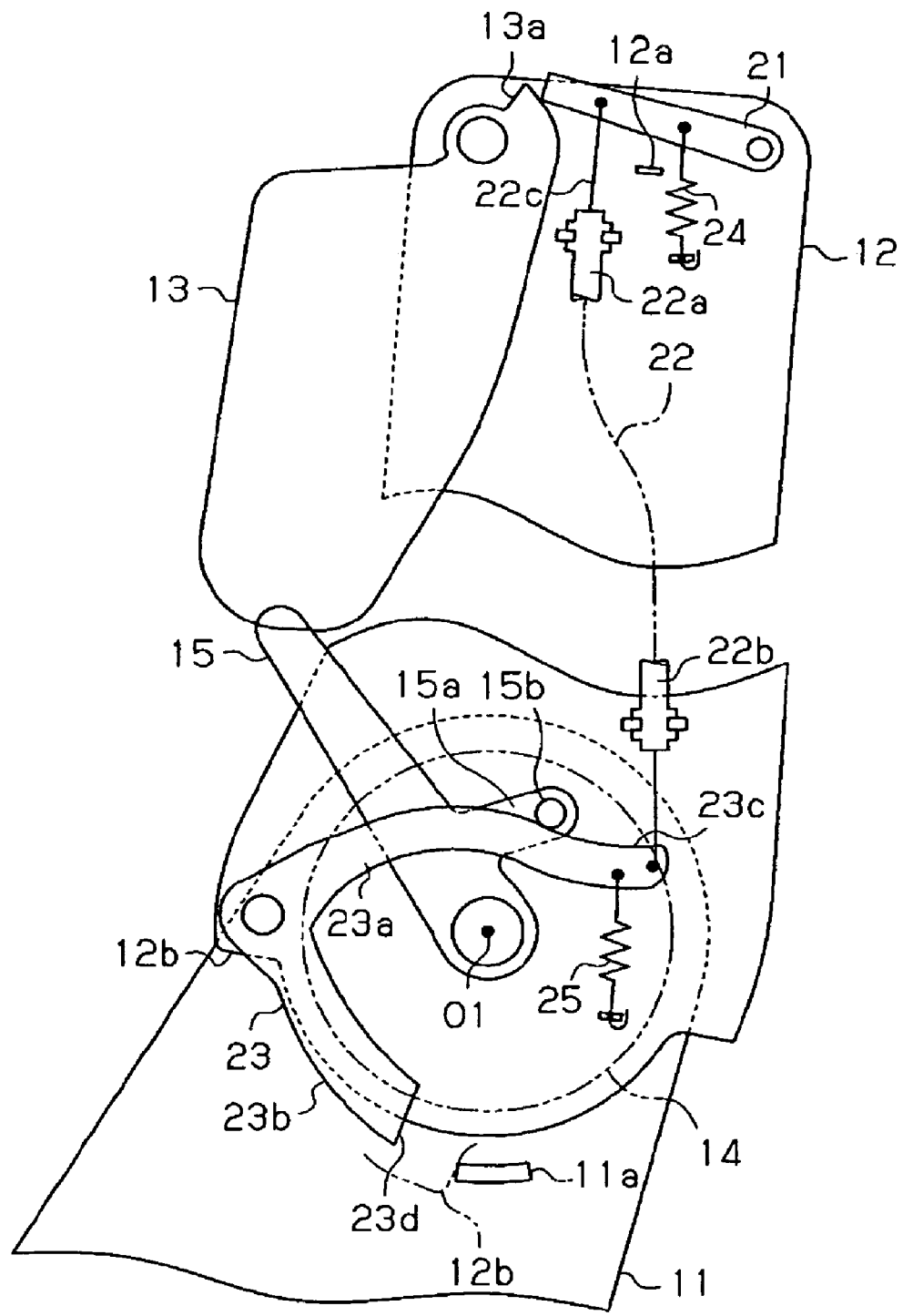
FIG. 2 is a side view schematically showing the operation of the first embodiment.

FIGS. 1 and 2 are schematic side views of a vehicle seat mounted in a vehicle, such as an automobile, to which the present invention is applied. The right side in FIGS. 1 and 2 corresponds to the rear side of the vehicle. The vehicle seat is a rear seat disposed behind a driver's seat or a front passenger's seat.

Referring to FIGS. 1 and 2, the vehicle seat includes a lower arm 11 serving as a frame of a seat cushion, a seat back 12 connected to the lower arm 11 so as to pivot on a pivot O1, and a headrest 13 pivotally connected to the upper front of the seat back 12. In the first embodiment, the headrest 13 is retracted by being pivoted in one direction (counterclockwise in FIG. 1) to tilt forward. The headrest 13 is retracted to prevent the vehicle seat from interfering with peripheral components (e.g., a front seat) in the cabin when being retracted, or to make the entire seat compact for a larger storage space.

The vehicle seat also includes a known type of lock member 14 disposed coaxially with the pivot O1 of the lower arm 11 and the seat back 12, and an operation lever 15 connected as an unlock member to the lock member 14 so as to turn on the pivot O1. The lock member 14 and the operation lever 15 are connected to each other so that a turning force can be transmitted therebetween.

The lock member 14 regulates the pivotal motion of the seat back 12 relative to the lower arm 11 by a biasing force of a biasing member (not shown), and locks the tilting angle of the seat back 12 with respect to the seat cushion (lower arm 11). In this case, a turning force is not transmitted between the lock member 14 and the operation lever 15, and the operation lever 15 is held to extend in the longitudinal direction of the seat back 12.

When the operation lever 15 is turned counterclockwise and the turning force is transmitted to the lock member 14, the lock member 14 allows the seat back 12 to pivot relative to the lower arm 11 against the force of the biasing member, and unlocks the tilting angle of the seat back 12 with respect to the lower arm (seat cushion) 11. Therefore, in this state, the seat back 12 can be tilted relative to the lower arm (seat cushion) 11. When the force applied to the operation lever 15 is removed, the lock member 14 regulates again the pivotal motion of the seat back 12 relative to the lower arm 11 by using the biasing force of the biasing member.

The seat back 12 includes an interlock link 21 that forms an interlock member, a double-pipe interlock cable 22, and a stopper link 23 serving as a tilting-angle switching member. The interlock link 21 is turnably connected to the upper rear of the seat back 12, and a front end thereof is disposed near the pivot of the headrest 13. One end of a coil spring 24 is retained at the longitudinal center of the interlock link 21, and the other end thereof is retained by the seat back 12. The interlock link 21 is biased by the coil spring 24 to turn in counterclockwise, and the turning in this direction is regulated by a stopper 12a provided on the seat back 12. An interlock cam 13a depressed in the radial direction is provided at a base end of the headrest 13.

When the headrest 13 is pivoted in one direction (counterclockwise in FIG. 1) to tilt forward for retraction, the front end of the interlock link 21 is pressed by the interlock cam 13a, and the interlock link 21 turns in the other direction (clockwise in FIG. 1) against the force of the coil spring 24 (see FIG. 2). While the headrest 13 is retracted, the front end of the interlock link 21 remains retained by the interlock cam 13a, and the interlock link 21 is held at the turned position against the force of the coil spring 24. When the retracted headrest 13 is pivoted clockwise to return, the interlock link 21 is released from the interlock cam 13a, and is turned counterclockwise by the biasing force of the coil spring 24 until it is stopped by the stopper 12a.

One cable terminal 22a of the interlock cable 22 is fixed to the seat back 12 below the interlock link 21. The other cable terminal 22b of the interlock cable 22 is fixed to the seat back 12 above the stopper link 23. One end (an end protruding from the cable terminal 22a) of an inner wire 22c of the interlock cable 22 is connected to the front end of the interlock link 21, and the other end (an end protruding from the cable terminal 22b) of the inner wire 22c is connected to the stopper link 23.

Accordingly, as the interlock link 21 turns clockwise, the interlock cable 22 draws out the inner wire 22c through the cable terminal 22a, and draws in the inner wire 22c through the cable terminal 22b. With a turn of the stopper link 23, which will be described below, the interlock cable 22 draws in the inner wire 22c through the cable terminal 22a, and draws out the inner wire 22c through the cable terminal 22b.

That is, the stopper link 23 is turnably connected to the front base end of the seat back 12, and includes an upper interlock link portion 23a and a lower stopper link portion 23b. The interlock link portion 23a extends rearward above the pivot O1 of the operation lever 15. One end of a coil spring 25 is retained at the rear end of the interlock link portion 23a, and the other end thereof is retained by the seat back 12. The interlock link portion 23a (stopper link 23) is biased by the coil spring 25 so as to turn clockwise in FIG. 1 The end of the inner wire 22c protruding from the cable terminal 22b is connected to the rear end of the interlock link portion 23a.

Accordingly, when the stopper link 23 is turned clockwise by the biasing force of the coil spring 25, the interlock cable 22 draws in the inner wire 22c through the cable terminal 22a, and draws out the inner wire 22c through the cable terminal 22b until the interlock link 21 is stopped by the stopper 12a. An upper end face of the interlock link portion 23a forms a guide face 23c having a longitudinal center portion curved in the radial direction of the pivot O1 of the operation lever 15.

The stopper link portion 23b extends rearward in the circumferential direction of the pivot O1 of the seat back 12. The stopper link portion 23b serves to switch an adjustable range of the tilting angle of the seat back 12 with respect to the lower arm 11 between a retracted state and a returned (standing) state of the headrest 13.

The switching will now be described in more detail. A stopper 11a serving as a retaining member is fixed on the lower arm 11. In a returned state of the headrest 13 shown in FIG. 1, a contact face 23d defined by a front end face of the stopper link portion 23b faces the stopper 11a in the circumferential direction of the pivot O1. A stopper 12b is provided on the seat back 12 to protrude near the center of turning of the stopper link 23 in the radial direction of the pivot O1, and points toward the stopper 11a in the circumferential direction of the pivot O1. Needless to say, the contact face 23d is disposed closer to the stopper 11a than the stopper 12b because of the length of the stopper link portion 23b. Therefore, in the returned state (standing state) of the headrest 13, the forward tilting angle of the seat back 12 can be adjusted until the contact face 23d of the stopper link 23 is stopped by the stopper 11a. This state in which the adjustable range of the tilting angle is regulated by the contact face 23d in the returned state of the headrest 13 is referred to as a seating state. In this seating state, the adjustable range of the tilting angle is set to be fitted for seating so that the seat back 12 can be prevented from excessively tilting forward. Accordingly, the passenger can adjust and lock the tilting angle within the above-described adjustable range, as necessary.

In a retracted state of the headrest 13 shown in FIG. 2, the contact face 23d moves inward in the radial direction of the pivot O1 with the counterclockwise turn of the stopper link 23, and separates from the stopper 11a in the circumferential direction of the pivot O1. In this case, only the stopper 12b faces the stopper 11a. Therefore, in the retracted state, the adjustable range of the forward tilting angle of the seat back 12 is extended to a range that allows the stopper 12b of the seat back 12 to be retained by the stopper 11a. This state in which the headrest 13 is retracted and in which the seat back 12 is tilted forward relative to the lower arm 11 until the stopper 12b is retained by the stopper 11a is referred to as a non-seating state, and corresponds to a retracted posture of the vehicle seat.

The operation lever 15 has an extending portion 15a extending toward one side (right side in FIG. 1) in the circumferential direction of the pivot O1. A pin 15b protrudes from the extending portion 15a so as to be in contact with the guide face 23c of the interlock link portion 23a. The pin 15b moves along the guide face 23c when the operation lever 15 is turned counterclockwise in order to unlock the tilting angle in the returned state of the headrest 13 shown in FIG. 1 Therefore, the stopper link 23 does not substantially interfere with the operation of the operation lever 15.

When the stopper link 23 turns counterclockwise, the pin 15b is pressed by the guide face 23c, and the operation lever 15 is thereby turned in the same direction. In this case, the tilting angle is unlocked, as described above.

The operations of the first embodiment will now be summarized. First, a description will be given of an operation of retracting the headrest 13 from a returned state (seating state) shown in FIG. 1 When the headrest 13 is pivoted in one direction (counterclockwise in FIG. 1) in this state, the front end of the interlock link 21 is pressed by the interlock cam 13a, and the interlock link 21 is turned in the other direction (clockwise in FIG. 1) against the force of the coil spring 24, as shown in FIG. 2

In this case, the interlock cable 22 draws out the inner wire 22c through the cable terminal 22a, and draws in the inner wire 22c through the cable terminal 22b. Consequently, the stopper link 23 is pulled by the interlock cable 22 (inner wire 22c), and turns counterclockwise against the force of the coil spring 25. The contact face 23d moves inward in the radial direction of the pivot O1, and the adjustable range of the forward tilting angle of the seat back 12 is extended to a range that allows the stopper 12b of the seat back 12 to be retained by the stopper 11a. Simultaneously, the pin 15b is pressed by the guide face 23c, and the operation lever 15 turns counterclockwise, and removes the locking of the tilting angle by the lock member 14.

That is, when the headrest 13 is retracted, the locking of the tilting angle by the lock member 14 is removed, regardless of the tilting angle. By tilting the seat back 12 forward in this state until the stopper 12b is stopped by the stopper 11 a, a non-seating state is brought about.

Even when the seat back 12 is raised from the non-seating state, of course, the tilting angle remains unlocked as long as the headrest 13 is retracted. Subsequently, when the headrest 13 is pivoted and returned clockwise, the interlock link 21 separates from the interlock cam 13a, and is turned counterclockwise by the biasing force of the coil spring 24 until it is stopped by the stopper 12a.

In this case, since the stopper link 23 is turned clockwise by the biasing force of the coil spring 25, the interlock cable 22 draws in the inner wire 22c through the cable terminal 22a and draws out the inner wire 22c through the cable terminal 22b until the interlock link 21 is retained by the stopper 12a. With this, the contact face 23d faces the stopper 11a in the circumferential direction of the pivot O1, and the adjustable range of the forward tilting angle of the seat back 12 is limited to the range set for the seating state. Simultaneously, the operation lever 15 is turned clockwise because the pin 15b is released from the guide face 23c, and allows the tilting angle to be locked by the lock member 14. That is, when the headrest 13 is returned, the tilting angle can be locked within the adjustable range set for the seating state.

As described in detail above, the first embodiment provides the following advantages:

(1) The tilting angle of the seat back 12 with respect to the seat cushion (lower arm 11) is unlocked by the operation lever 15 in conjunction with the interlock link 21, the interlock cable 22, and the stopper link 23 that operate in response to retraction of the headrest 13, and the seat back 12 is permitted to tilt. Therefore, when the headrest 13 is retracted, the seating state can be switched to the non-seating state without performing any troublesome manual operation of the operation lever 15.

(2) The stopper 12b is released from the stopper 11a in conjunction with the interlock link 21, the interlock cable 22, and the stopper link 23 that operate in response to retraction of the headrest 13. The adjustable range of the tilting angle set for the seating state is extended by the stopper link 23 (stopper link portion 23b) to the range set for the non-seating state. In other words, the tilting angle cannot be adjusted beyond the adjustable range set for the seating state unless the headrest 13 is retracted. This prevents the passenger from sitting on the seat tilted at an improper angle.

(3) Unless the retracted headrest 13 returns, the lock member 14 cannot lock the tilting angle even within the adjustable range set for the seating state, and this inhibits the passenger from sitting on the seat while the headrest 13 is retracted. That is, since the passenger cannot sit on the seat without returning the headrest 13, safety can be ensured.

(4) By using the retraction (pivotal motion) of the headrest 13 to be performed in a manner that can be relatively flexibly changed, the locking of the tilting angle by the lock member 14 is removed. This increases the degree of flexibility in design. That is, the structure for removing the locking of the tilting angle by the lock member 14 can be made more versatile by using the wide pivot range of the headrest 13.

Second Embodiment

A second embodiment of the present invention will be described below with reference to the drawings. The second embodiment is similar to the first embodiment in that the tilting angle of the seat back 12 with respect to the seat cushion (lower arm 11) is unlocked in association with the retraction of the headrest, but is different in that the locking is permitted again after the retraction is completed. Components similar to those in the first embodiment are denoted by the same reference numerals, and detailed descriptions thereof are omitted.

FIGS. 3 to 6 are schematic side views of a vehicle seat mounted in a vehicle, such as an automobile, to which the present invention is applied. As shown in these figures, a headrest 31 is pivotally connected to the upper front of a seat back 12. The seat back 12 is provided with a first interlock link 32 and a second interlock link 33 that constitute the interlock member, instead of the interlock link 21 in the first embodiment.

The first interlock link 32 is turnably connected to the upper rear of the seat back 12, and extends frontward near the pivot of the headrest 31. One end of a coil spring 24 is retained at the longitudinal center of the first interlock link 32. The first interlock link 32 is biased by the coil spring 24 so as to turn in one direction (counterclockwise in FIG. 3), and the turn in that direction is regulated by a stopper 12a. One end of an inner wire 22c (an end protruding from one cable terminal 22a) is connected to the front end of the first interlock link 32.

The second interlock link 33 is turnably connected to the front end of the first interlock link 32. The second interlock link 33 extends toward the base end (the center of turning) of the first interlock link 32, and is engaged with the first interlock link 32 while a retaining pin 33a protruding at the rear end is fitted in a slot 32a of the first interlock link 32. The slot 32a extends in the circumferential direction of the center of turning of the second interlock link 33. The second interlock link 33 is allowed to turn relative to the first interlock link 32 within a range in which the retaining pin 33a moves between inner walls at one end and the other end of the slot 32a in the circumferential direction.

The second interlock link 33 has a link portion 33b protruding from the first interlock link 32 toward the pivot of the headrest 31. A pair of first and second interlock cams 31a and 31b extend in the radial direction at the base end of the headrest 31. The first interlock cam 31a lies ahead of the second interlock cam 31b when the headrest 31 pivots in one direction (counterclockwise in FIG. 3).

Accordingly, when the headrest 31 is pivoted counterclockwise for retraction while being tilted forward, the link portion 33b of the second interlock link 33 is pressed by the first interlock cam 31a. In this case, the retaining pin 33a of the second interlock link 33 is retained by the inner wall at one side (lower side in FIG. 3) of the slot 32a in the circumferential direction, the relative turn of the first and second interlock links 32 and 33 is limited, and the first and second interlock links 32 and 33 turn together in the other direction (clockwise in FIG. 3) against the force of the coil spring 24 (see FIG. 4).

In a manner similar to that in the first embodiment, when the first interlock link 32 turns, the tilting angle is unlocked from a lock member 14, and the adjustable range of the forward tilting angle of the seat back 12 is extended to a range that allows a stopper 12b of the seat back 12 to be stopped by a stopper 11a.

Figure 4:
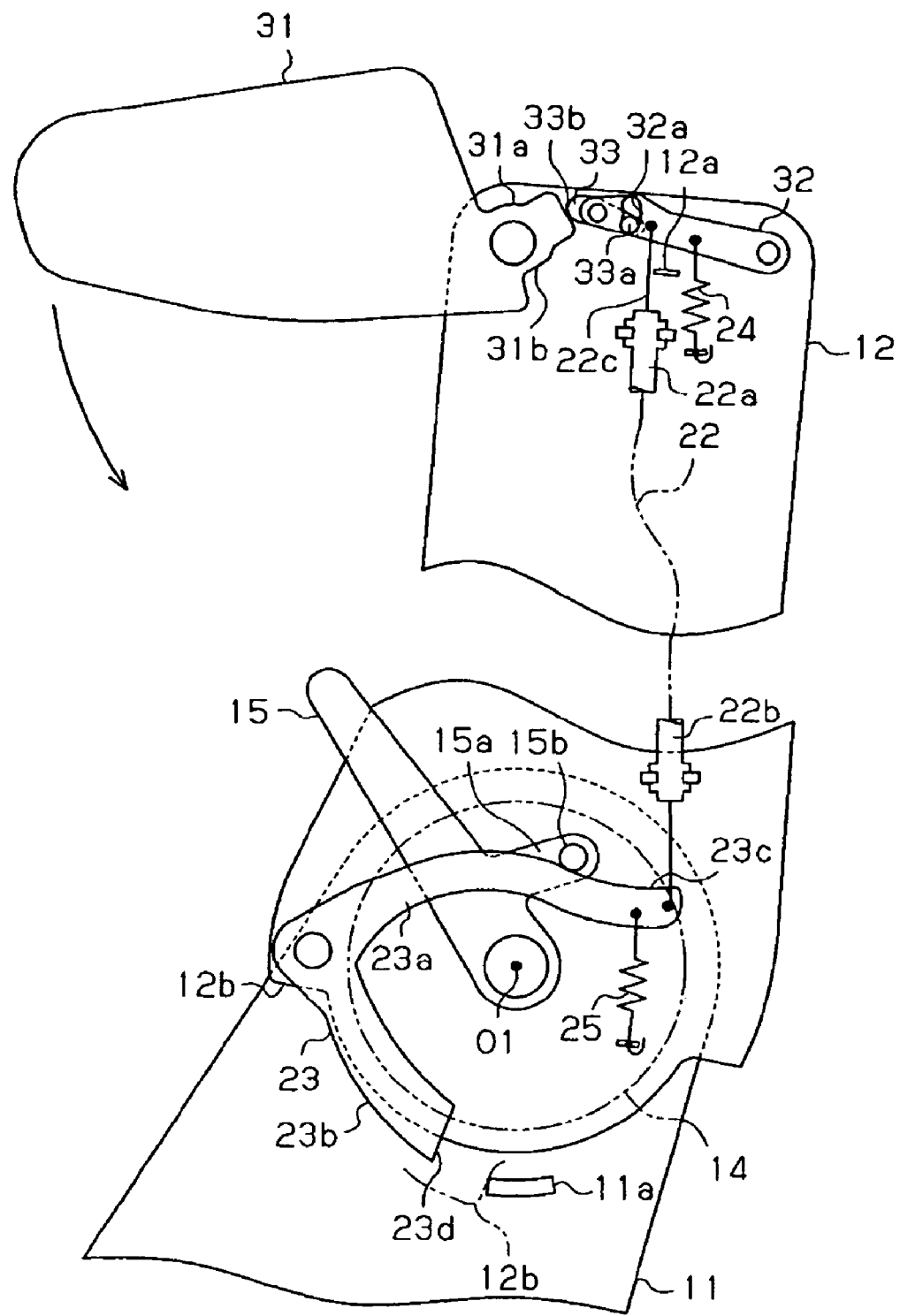
FIG. 4 is a side view schematically showing the operation of the second embodiment.
Figure 5:
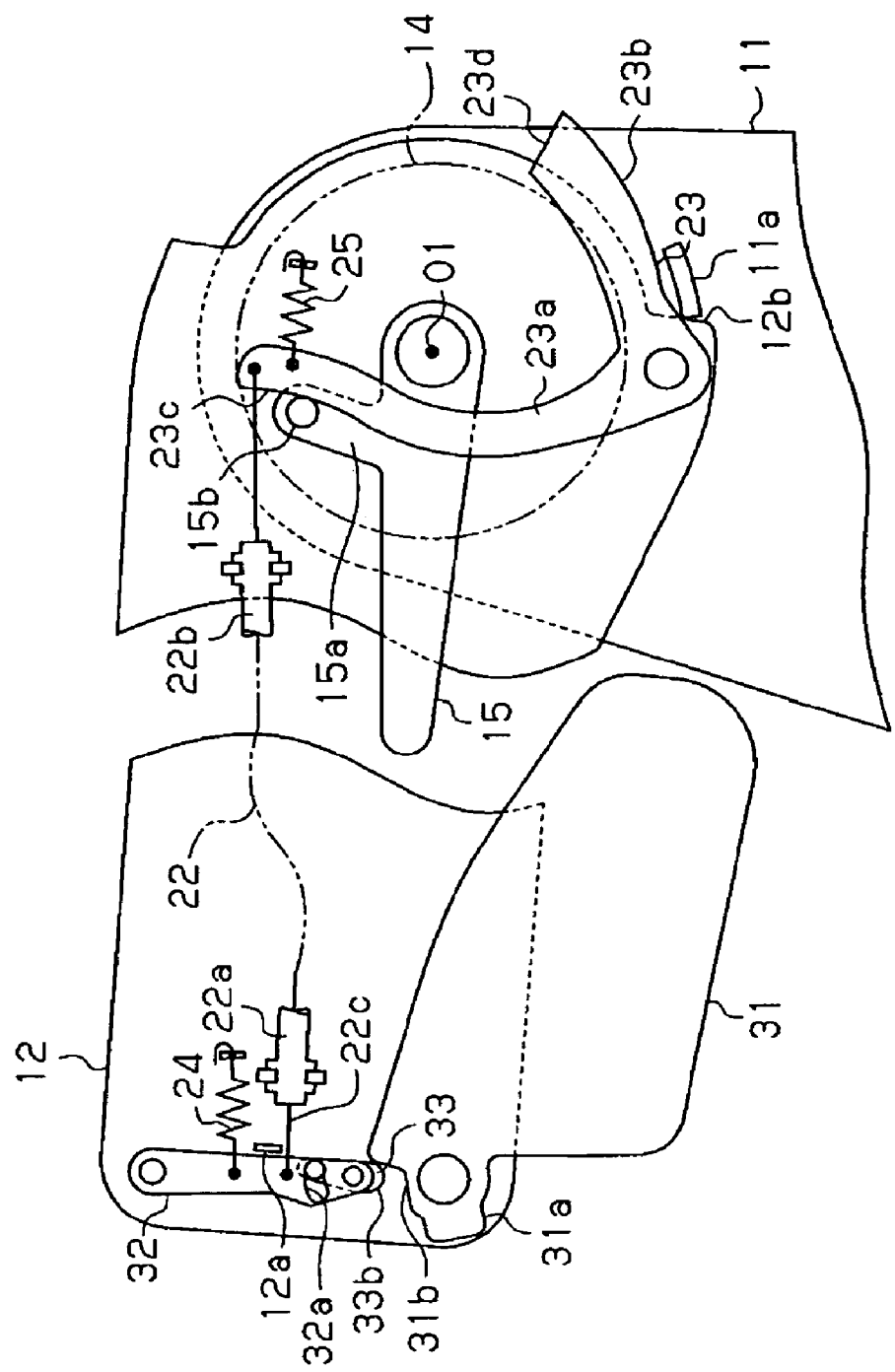
FIG. 5 is a side view schematically showing the operation of the second embodiment.

By tilting the seat back 12 forward relative to the lower arm 11 until the stopper 12b is stopped by the stopper 11a while the headrest 31 is being retracted, as shown in FIG. 4, a non-seating state is brought about in response to the completion of retraction of the headrest 31 (see FIG. 5).

As shown in FIG. 5, when the headrest 31 is completely retracted, the link portion 33b of the second interlock link 33 opposes the second interlock cam 31b after passing through the first interlock cam 31a. In this case, the second interlock link 33 is released, and the first interlock link 32 is turned counterclockwise together with the second interlock link 33 by the biasing force of the coil spring 24 until it is stopped by the stopper 12a. The tilting angle is thereby allowed to be locked by the lock member 14, as described above. Correspondingly, a contact face 23d of a stopper link 23 moves (returns) outward in the radial direction of the pivot O1. Since a stopper link portion 23b is curved outside the stopper 11a, it does not interfere with the stopper 11a in the non-seating state.

Figure 3:
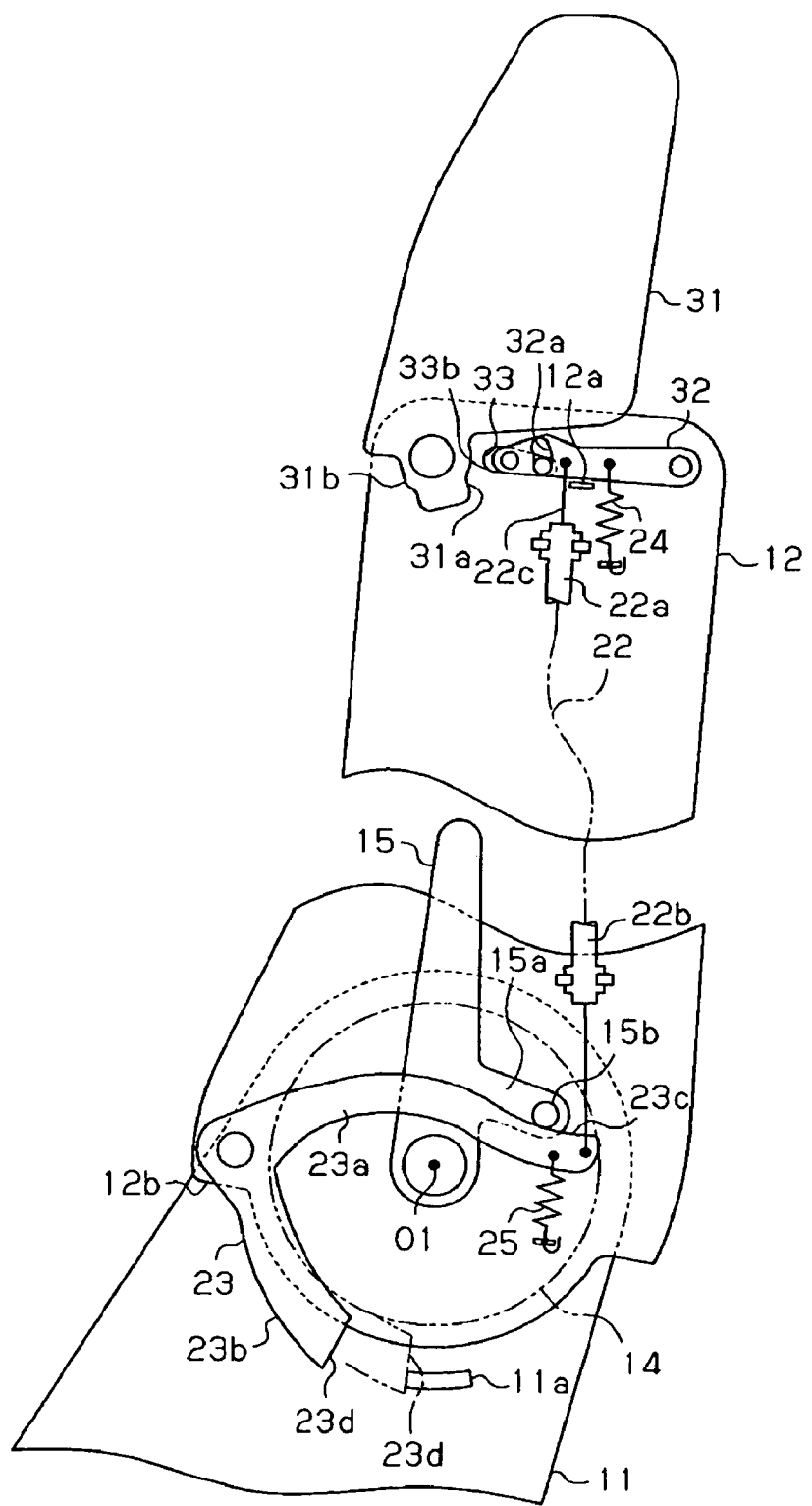
FIG. 3 is a side view schematically showing a second embodiment of the present invention.
Figure 6:
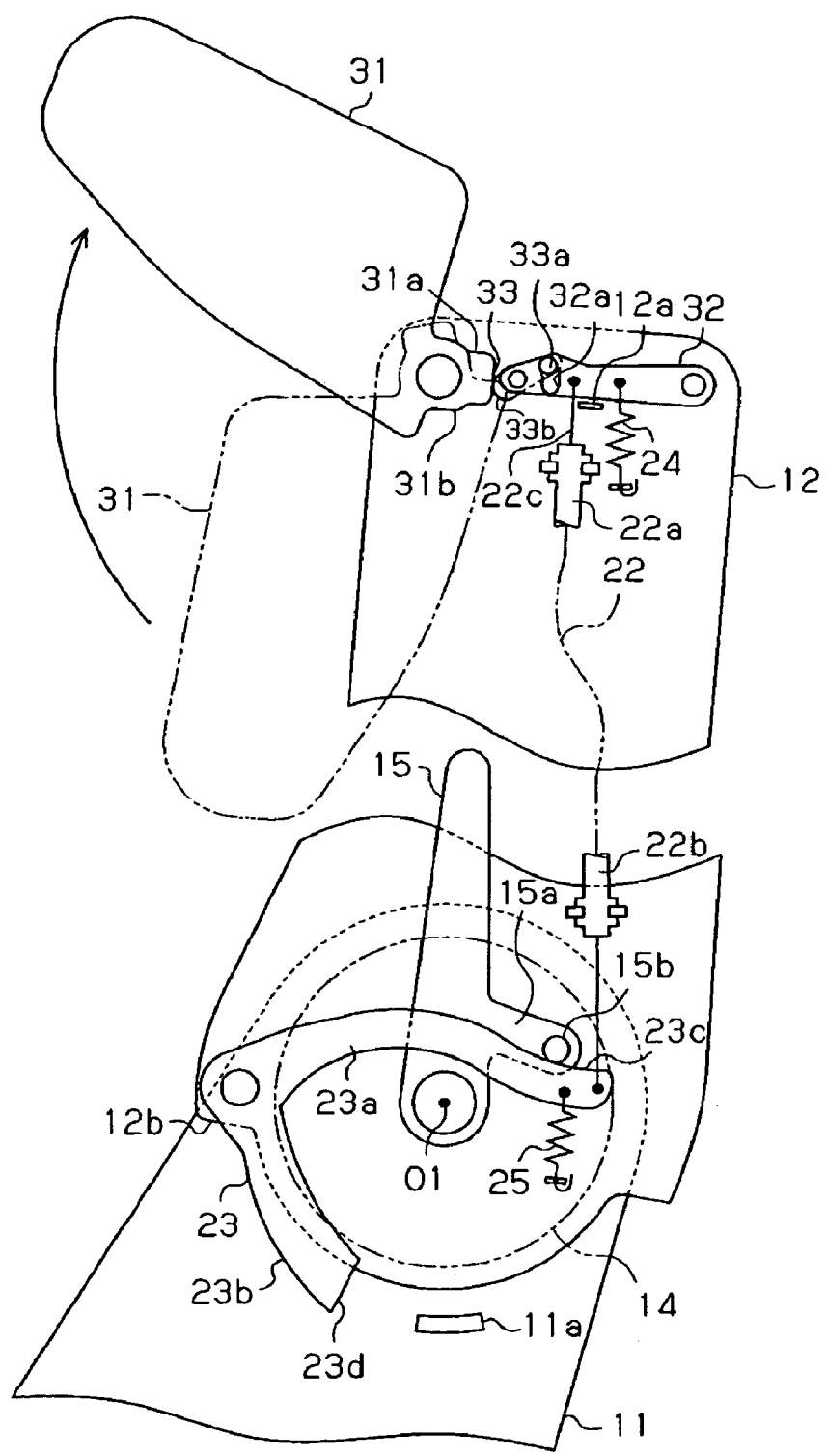
FIG. 6 is a side view schematically showing the operation of the second embodiment.
Figure 7:
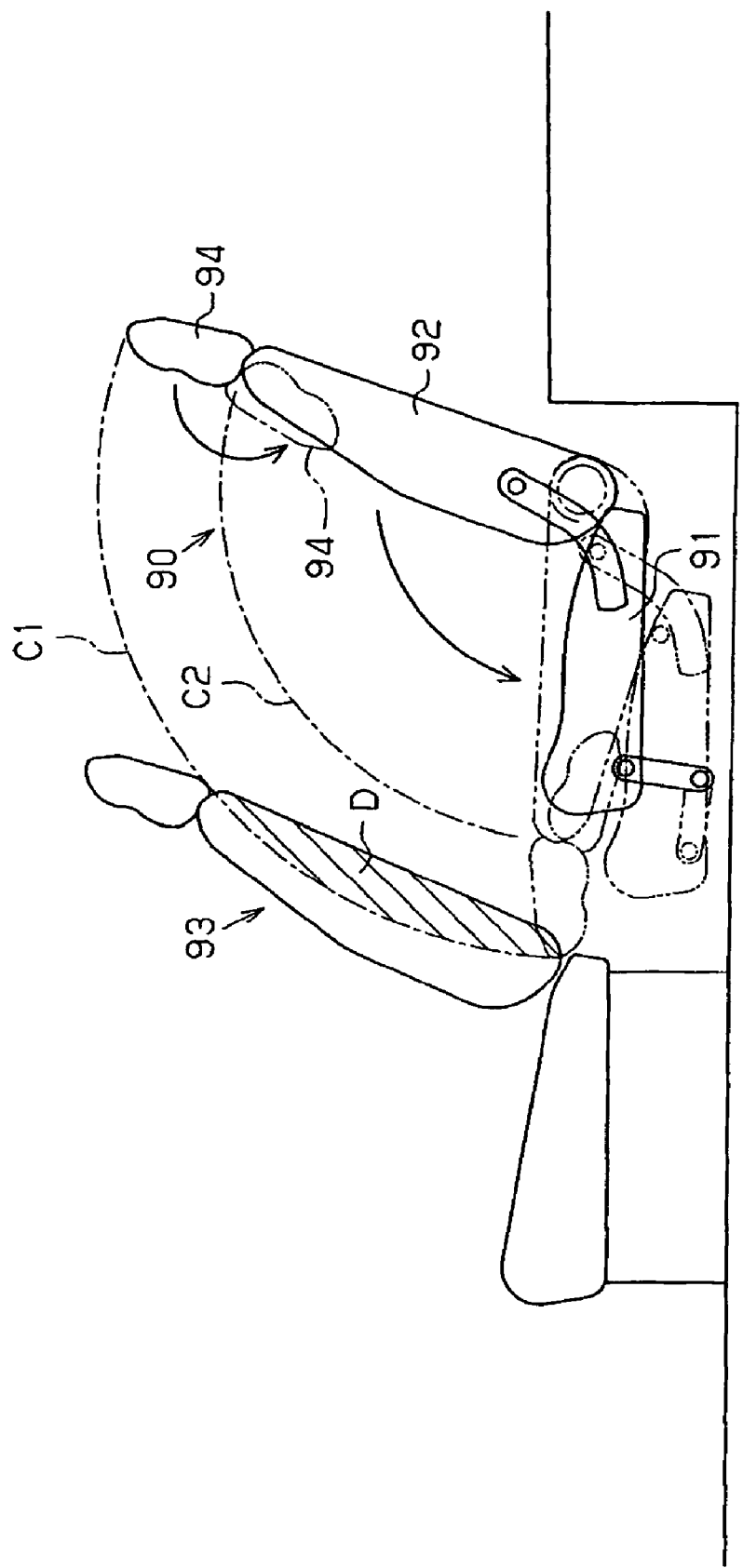
FIG. 7 is an explanatory view showing the necessity of retracting a headrest.

When the locking of the tilting angle by the lock member 14 is removed by turning an operation lever 15, and the seat back 12 is raised from the non-seating state, as shown in FIG. 6, the tilting angle is locked by releasing the operation lever 15, regardless of whether or not the headrest 31 is retracted. Subsequently, when the headrest 13 is returned by being pivoted clockwise, the second interlock cam 31b is brought into contact with the link portion 33b. The second interlock link 33 turns counterclockwise until the retaining pin 33a is retained by the inner wall of the slot 32a, thereby absorbing the contact. The turn of the second interlock link 33 does not substantially interfere with the first interlock link 32, and the locking of the tilting angle by the lock member 14 is not removed during return of the headrest 31. When the headrest 31 is completely returned, the link portion 33b opposes the first interlock cam 31a after passing through the second interlock cam 31b, as shown in FIG. 3

As described in detail above, the second embodiment provides the following advantage, in addition to the advantages (1), (2), and (4) of the first embodiment:

In a retracted state and a returned state of the headrest 31, the tilting angle can be locked by the lock member 14 within the adjustable range of the tilting angle set for a seating state. Therefore, the tilting angle can be locked, regardless of whether or not the headrest 31 is retracted. For example, only the headrest 31 can be retracted in the seating state in order to widen the field of view. Since it is necessary to return only the headrest 31 when the passenger sits on the seat, switching to the seating state can be performed easily.

The following modifications may be made to the above embodiments:

In the second embodiment, the first interlock link 32 may have a retaining pin, and the second interlock link 33 may have a slot in which the retaining pin is fitted.

In the first and second embodiments, the stopper link 23 and its peripheral components may be omitted, and the locking of the tilting angle by the lock member 14 may be removed in association with the retraction of the headrest 13 or 31.

The interlock cable 22 may not be of a double-pipe type, as long as it can connect the interlock link 21 or the first interlock link 32 to the stopper link 23.

The center of turning of the operation lever 15 may be shifted from the pivot O1.

The headrest may be retracted by being tilted rearward, or by being slid toward the seat back 12. In short, it is satisfactory as long as the locking of the tilting angle by the lock member 14 is removed in association with the retraction of the headrest in these manners.

The vehicle seat may be retracted by tilting the seat back 12 rearward relative to the seat cushion (lower arm 11). Alternatively, the vehicle seat may be retracted in a storage space (e.g., an underfloor storage space) provided in the floor of the vehicle, regardless of whether the seat back 12 tilts forward or rearward.

The present invention is also applicable to, for example, a retractable seat that can be stored in a storage space in a non-use state, a table seat that functions as a table, and a tumble seat.

The present invention is not limited to the above-described embodiments, and various modifications are possible without departing from the scope of the invention.

What is claimed is:

1. A vehicle-seat retracting apparatus wherein a seating state is switched to a non-seating state by retracting a headrest and tilting a seat back relative to a seat cushion, and wherein the vehicle-seat retracting apparatus comprises:

a lock member for locking a tilting angle of the seat back with respect to the seat cushion;

an interlock member to operate in association with retraction of the headrest;

an unlock member pivoting on a pivot to unlock the tilting angle;

a tilting-angle switching member turnably supported by the seat back to connect the interlock member and the unlock member; and a retaining member provided in the seat cushion, wherein the tilting-angle switching member includes an upper interlock link portion connected to the interlock member and a lower stopper link portion contacting with the retaining member, and is retained by the retaining member with the lower stopper link portion contacting with the retaining member to regulate an adjustable range of the tilting angle to a seating range set for the seating state, and separates from the retaining member with the lower stopper link portion separating from the retaining member to extend the adjustable range from the seating range to a non-seating range set for the non-seating state.

2. The vehicle-seat retracting apparatus according to claim 1, wherein the tilting-angle switching member separates from the retaining member with a side turn of the stopper link in conjunction with the interlock member to extend the adjustable range from the seating range to a non-seating range set for the non-seating state.

3. The vehicle-seat retracting apparatus according to claim 2, wherein a pin protrudes from the unlock member so as to be in contact with the upper interlock link portion and when the pin is pressed by the upper interlock portion, the unlock member turns toward a side in the circumferential direction of the pivot and removes the locking of the tilting angle by the lock member.

4. The vehicle-seat retracting apparatus according to claim 3, wherein an upper end face of the interlock link portion forms a guide face having a longitudinal center portion curved in the radial direction of the pivot, wherein the pin moves along the guide face when the unlock member is turned toward the side in order to unlock the tilting angle, and the upper interlock link portion does not substantially interfere with the unlock member.

5. The vehicle-seat retracting apparatus according to claim 3, wherein the unlock member has an extending portion extending toward one side in the circumferential direction of the pivot and the pin protrudes from the extending portion.

6. The vehicle-seat retracting apparatus according to claim 1, wherein a first interlock link is turnably connected to the seat back and extends toward a pivot of the headrest, wherein a second interlock link is turnably connected to a front end of the first interlock link and the second interlock link extends toward a base end of the first interlock link and is engaged with the first interlock link while a retaining pin protruding at an end of the second link is fitted in a slot of the first interlock link, wherein the second interlock link is allowed to turn relative to the first interlock link within a range between one end and the other end of the slot in the circumferential direction, wherein the second interlock link has a link portion protruding from the first interlock link toward the pivot of the headrest, wherein a pair of first and second interlock cams extend in a radial direction at a base end of the headrest, wherein the first interlock cam lies ahead of the second interlock cam when the headrest pivots in a direction.

7. The vehicle-seat retracting apparatus according to claim 6, wherein the interlock member and the unlock member are connected by a cable extending from the seat cushion to the seat back.

8. The vehicle-seat retracting apparatus according to claim 1, wherein a stopper being retained by the retaining member is provided on the seat back, and a contact face of the lower stopper link portion which contacts with the retaining member is disposed closer to the stopper than the retaining member.

* * * * *